July 14, 1925.
L. C. DREFAHL
1,546,061
PROCESS OF HEATING LIQUIDS
Filed Nov. 23, 1923
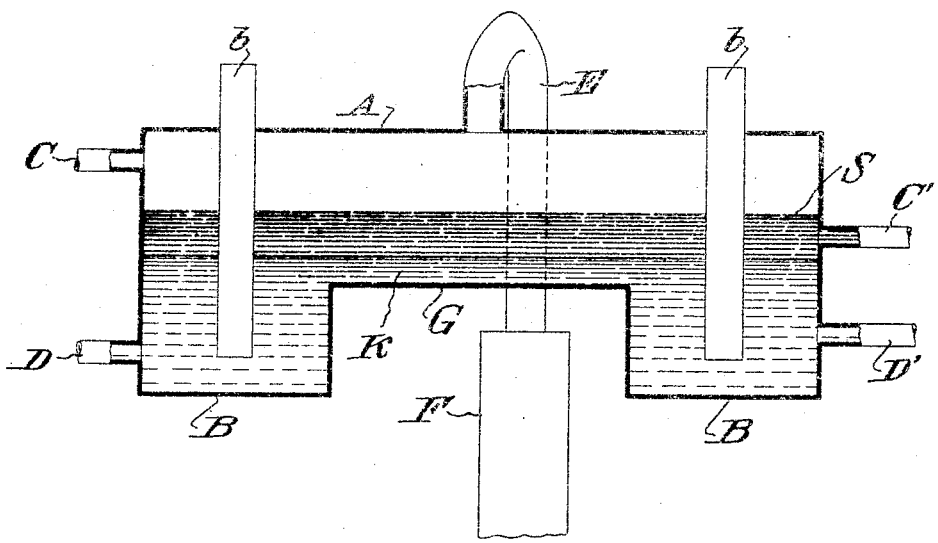
Inventor:
Louis Charles Drefahl
By Byrnes Townsend & Buckenstein
his Attorneys.

Patented July 14, 1925.

1,546,061

UNITED STATES PATENT OFFICE.

LOUIS CHARLES DREFAHL, OF LAKEWOOD, OHIO, ASSIGNOR TO THE GRASSELLI CHEMICAL COMPANY, OF CLEVELAND, OHIO, A CORPORATION OF OHIO.

PROCESS OF HEATING LIQUIDS.

Application filed November 23, 1923. Serial No. 676,606.

*To all whom it may concern:*

Be it known that I, LOUIS CHARLES DREFAHL, a citizen of the United States, residing at Lakewood, in the county of Cuyahoga and State of Ohio, have invented certain new and useful Improvements in Processes of Heating Liquids, of which the following is a specification.

This invention relates to a new process for the direct application of electrically generated heat to liquids which are non-conductors or poor conductors of electricity, and consists generally in contacting the liquid to be heated with another liquid which is maintained at the desired temperature by the passage of electric current therethrough.

It has already been proposed to heat liquids which are conductors of electricity by the passage of electric current therethrough and to use the heat so generated for instance for distilling the liquid itself or by transmission through the walls of the liquid receptacle which constitute fixed heating surfaces to other bodies such as the surrounding atmosphere or other liquids to be heated.

As distinguished from such prior uses of heat generated by the passage of electric current through a conducting liquid and from methods of heating liquids in general by contact with fixed heating surfaces the present invention involves the heating of a liquid which is a non-conductor of electricity, by direct contact with another electrically heated conducting liquid or resistor.

The process of course has numerous applications. It may be applied for instance to numerous combinations of liquid resistors and liquids to be heated and the heat applied may be used for any desired purpose such as for instance the distillation of the liquid to be heated. The heat generated in the liquid resistor may be applied to the liquid to be heated in a variety of ways, for instance, if the liquid to be heated and the liquid resistor are miscible or mutually soluble as are for instance glycerine and an aqueous solution of common salt they may be mixed together and electric current passed through the mixture. The conductive liquid selected as the resistor of course will depend upon the nature of the liquid to be heated. Liquids must be selected which will not undesirably react with each other and if the liquid to be heated is to be recovered in pure form its separation from the liquid resistor must be taken into consideration. Alcohol for example may be distilled by mixing it with an aqueous solution of common salt and electrically heating the mixture, the difference between the boiling points of the alcohol and the aqueous solution of salt making possible the separation. Or one may select as the liquid resistor a liquid which is not miscible with the liquid to be heated. For instance a light liquid such as ethyl ether or a light hydrocarbon such as petroleum ether may be heated or distilled by floating it in a layer of the desired thickness upon a body of electrically heated aqueous solution of salt or a heavy liquid such as carbon tetrachloride may be heated by an electrically heated body of an aqueous solution of salt floating on top of it or if desired the two mutually insoluble liquids, may be intimately mixed by agitation and heat supplied to the liquid to be heated by the passage of electric current through the mixture.

The process may be employed not only for heating liquids or for distilling them by heating them to boiling temperature, but may also be used for steam distillations. For instance, if the liquid to be heated is an aqueous liquid steam may be generated therefrom and serve for the steam distillation of a component thereof or the steam required for the steam distillation may be generated from an aqueous liquid employed as the resistor.

The process of heating liquids, on account of the accurate temperature control which it affords, promises to be particularly advantageous for the heating of liquids employed in chemical reactions in which accurate temperature control is necessary or desirable, such as for instance, chlorination and sulfonation reactions and fusions.

Apparatus suitable for carrying out one procedure in accordance with my invention is illustrated in the accompanying drawings in which the single figure is a sectional view of the apparatus. The apparatus illustrated is similar to that covered in an application filed May 29, 1922, in the names of Glenn A. Keep and Clayton M. Hoff, Serial No. 564,512.

The apparatus consists of a rectangular receptacle A made of any suitable nonconducting refractory material such as glass, porcelain or earthenware, stone or the like. The receptacle is formed with the deep electrode wells B, B, at its opposite ends into which the electrodes $b$, $b$, formed of carbon or the like project through suitable openings in the top of the receptacle. C and C' are an inlet and outlet respectively for the liquid to be heated and D and D' are an inlet and outlet respectively for the liquid resistor. E is a conduit leading from the top of the receptacle to a condenser F.

The operation of the apparatus for the distillation of a liquid which is immiscible with and lighter than the liquid resistor employed is as follows. The liquid resistor marked K is supplied to the receptacle A through the inlet D to the desired depth and if in the process there is a contamination of the liquid resistor fresh liquid may be continuously supplied through the inlet D and impure liquid withdrawn through the outlet D' at relative rates calculated to maintain the desired level of the liquid resistor in the receptacle A. The resistor K is heated by the passage of electric current therethrough between the electrodes $b$, $b$, the rate of heating and the temperature being adjusted by regulation of the depth of the liquid resistor in the receptacle A and the voltage maintained between the electrodes. It will be noted that the deep electrode wells B, B, provide at all times a large electrical contact area between the electrodes and the resistor and thus permit the passage of a relatively large current density through the relatively small cross sectional area of resistor over the bridge G between the electrode wells where the principal heating of the resistor by the electric current takes place.

The liquid to be distilled, marked S, is supplied to the receptacle A through the inlet C, and if it is to be simply heated or concentrated, and not completely distilled, the heated liquid of the distillation residue is discharged through the outlet C'. If liquid is being distilled, the distillate passes by way of the conduit E to the condenser F.

Assuming that the resistor is an aqueous salt solution and that the liquid to be heated is ether carrying dissolved therein normally solid impurities, then in such an instance, both the impure ether and the aqueous salt solution are continuously supplied, and the current density and rates of flow are adjusted so that the ether is completely distilled, and the deposited solid impurities are carried out of the receptacle A along with the discharged liquid resistor.

It will be apparent without further illustration, that if the liquid to be heated is heavier than the liquid resistor and immiscible therewith, the receptacle A may be simply turned upside down, and the electrodes $b$ $b$ made to enter the electrode wells B B from above, and the conduit E leading to the condenser connected to the then upper side of the receptacle for carrying off vaporized products.

If, as is suggested above, the liquid resistor and the liquid to be heated are mutually insoluble, they may be mixed together by means of any suitable agitating device and electric current passed through the mixture.

If the liquid resistor and the liquid to be heated are miscible, as for instance alcohol or glycerine and an aqueous salt solution, they may be mixed outside of the receptacle A, and supplied thereto through a single conduit, or the two separate liquids may be supplied as described above.

My process provides a very efficient method for the application of electrically generated heat to non-conductive liquids to be heated or distilled, and although the process is somewhat limited in its application with regard to the selection of liquid resistors compatible with the liquid to be heated, it promises to be of great value for the treatment of certain liquids, for instance in cases in which the liquid to be treated is explosive, or highly inflammable, thus rendering heating by means of fire dangerous, and in cases in which the liquid under treatment is highly corrosive, or carries impurities or material which upon heating or distillation, by contact with fixed heating surfaces would deposit solid material upon such fixed heating surfaces.

I claim:

1. Process of heating a liquid which is a non-conductor of electricity which comprises contacting the same with a liquid heated by the passage of an alternating electric current therethrough.

2. Process of heating a liquid which is a non-conductor of electricity which comprises contacting the same with a liquid immiscible therewith and heated by the passage of an alternating electric current therethrough.

3. Process of heating a liquid which is a non-conductor of electricity by contacting the same with an electrically heated immiscible liquid as defined in claim 2, in which the liquids are compatible and separable.

4. Process of heating a liquid which is a non-conductor of electricity by contacting the same with an electrically heated immiscible liquid as defined in claim 2 in which the liquids have different specific gravities.

5. Process of heating a liquid which is a non-conductor of electricity which comprises flowing the same in contact with another liquid immiscible therewith heated by the passage of an alternating electric current therethrough.

6. Process of heating a liquid which is a non-conductor of electricity which comprises flowing the same and a second liquid immiscible therewith which is a conductor of electricity in contact with each other, and passing an alternating electric current through said second liquid.

7. Process of heating a liquid which is a non-conductor of electricity which comprises mixing the same with liquid which is a conductor of electricity and passing an alternating electric current through the mixture.

8. Process of heating a liquid which is a non-conductor of electricity which comprises contacting the same with a liquid heated by the passage of electric current therethrough without electrolysis.

9. Process of heating a liquid which is a non-conductor of electricity which comprises contacting the same with a liquid immiscible therewith and heated by the passage of electric current therethrough without electrolysis.

10. Process of heating a liquid which is a non-conductor of electricity by contacting the same with an electrically heated immiscible liquid as defined in claim 9 in which the liquids are compatible and separable.

11. Process of heating a liquid which is a non-conductor of electricity by contacting the same with an electrically heated immiscible liquid as defined in claim 9 in which the liquids have different specific gravities.

12. Process of heating a liquid which is a non-conductor of electricity which comprises flowing the same in contact with another liquid immiscible therewith heated by the passage of electric current therethrough without electrolysis.

13. Process of heating a liquid which is a non-conductor of electricity which comprises flowing the same and a second liquid immiscible therewith which is a conductor of electricity in contact with each other, and passing electric current through said second liquid without electrolysis.

14. Process of heating a liquid which is a non-conductor of electricity which comprises mixing the same with liquid which is a conductor of electricity and passing electric current through the mixture without electrolysis.

In testimony whereof, I affix my signature.

LOUIS CHARLES DREFAHL.